United States Patent
Roscoe et al.

(10) Patent No.: US 7,791,846 B2
(45) Date of Patent: Sep. 7, 2010

(54) ARC FLASH DETECTION SYSTEM, APPARATUS AND METHOD

(75) Inventors: George William Roscoe, West Hartford, CT (US); Thomas Frederick Papallo, Jr., Farmington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/182,455

(22) Filed: Jul. 30, 2008

(65) Prior Publication Data

US 2010/0026425 A1 Feb. 4, 2010

(51) Int. Cl.
*H02H 3/00* (2006.01)
(52) U.S. Cl. .................. 361/2; 335/6; 335/18; 335/21
(58) Field of Classification Search .......... 361/2, 361/94–99; 335/6, 18, 21
See application file for complete search history.

(56) References Cited

U.S. PATENT DOCUMENTS

| 4,459,546 A | * | 7/1984 | Arrington et al. | ........... 324/142 |
| 4,878,144 A | * | 10/1989 | Nebon | ........... 361/96 |
| 5,064,998 A | * | 11/1991 | Holling | ........... 219/519 |
| 6,185,264 B1 | * | 2/2001 | Gashus | ........... 375/303 |

* cited by examiner

*Primary Examiner*—Ramon M Barrera
(74) *Attorney, Agent, or Firm*—Cantor Colburn LLP

(57) ABSTRACT

An arc flash system for a circuit breaker and a method of operation is provided. The arc flash system includes a first sensor such as a photo-detector and a second sensor that detects a circuit breaker parameter. The arc flash system is responsive to signals from the first sensor and second sensor to determine if an arc flash event is occurring to avoid nuisance tripping of the circuit breaker.

20 Claims, 7 Drawing Sheets

ARC FLASH DETECTION SYSTEM, APPARATUS AND METHOD

BACKGROUND

The present invention relates to arc flash prevention and mitigation technologies, and particularly relates to prevention of nuisance tripping in low voltage circuit breakers.

Electric power circuits and switchgear have conductors separated by insulation. Air space often serves as part or all of this insulation in some areas. If the conductors are too close to each other or voltage exceeds the insulation properties, an arc can occur between conductors. Air or any insulation (gas or solid dielectrics) between conductors can become ionized, making it conductive, which enables arcing. Arc temperature can reach as high as 20,000° C., vaporizing conductors and adjacent materials, and releasing significant energy.

Arc flash is the result of a rapid energy release due to an arcing flash between phase-phase, phase-neutral, or phase-ground. An arc flash can produce high heat, intense light, pressure waves, and sound/shock waves. However, the arc flash current is usually much less than a short circuit current, and hence delayed or no tripping of circuit breakers is expected unless the breakers are selected to handle an arc flash condition. Agencies and standards such as the National Environmental Policy Act (NEPA), Occupational Safety and Health Administration (OSHA), and Institute of Electrical and Electronics Engineers (IEEE) regulate arc flash issues through personal protective clothing and equipment, but there is no device established by regulation to eliminate arc flash.

Typically, an arc flash is detected, at least in part through the use of a light-sensor or a photo-detector that detects light emitted by the arc. These light sensors are very sensitive to light and may be triggered by a bright light from the surrounding environment. This sensitivity to ambient light conditions results in nuisance tripping of the circuit breaker causing unnecessary loss of electrical power to the protected circuit.

Accordingly, while present arc flash detection systems are suitable for their intended purposes, there is a need in the art for an arc flash detection arrangement that reduces or eliminates the false detection of arc flash events.

BRIEF DESCRIPTION OF THE INVENTION

A method of detecting an arc flash with a circuit breaker is provided. The method includes detecting the presence of light in the circuit breaker. Detecting a circuit breaker parameter indicating the position of a contact arm in the circuit breaker. Delaying the response of an arc flash detector for a fixed period of time. Finally, tripping the circuit breaker after the fixed period of time if the light is still detected.

A circuit breaker is also provided having a housing. An inlet terminal is positioned at one end of the housing. An outlet terminal is also position at an end of the housing where the outlet terminal is electrically coupled to the inlet terminal. A movable contact arm is arranged within the housing where the contact arm is electrically coupled between the inlet terminal and the outlet terminal. A light sensor is positioned to detect the presence of light in the housing. A parameter sensor is coupled to measure a circuit breaker parameter. An arc flash detector is electrically coupled to the light sensor and the parameter sensor, the arc flash detector being responsive to delay tripping of the circuit breaker in response to signals from the light sensor and said parameter sensor.

A circuit breaker is also provided having a light sensor and a parameter sensor. A trip unit is electrically coupled to the light sensor and the parameter sensor. The trip unit has a controller that is response to executable computer instructions for delaying the tripping response of the circuit breaker in response to receiving a signal from the light sensor and the parameter sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
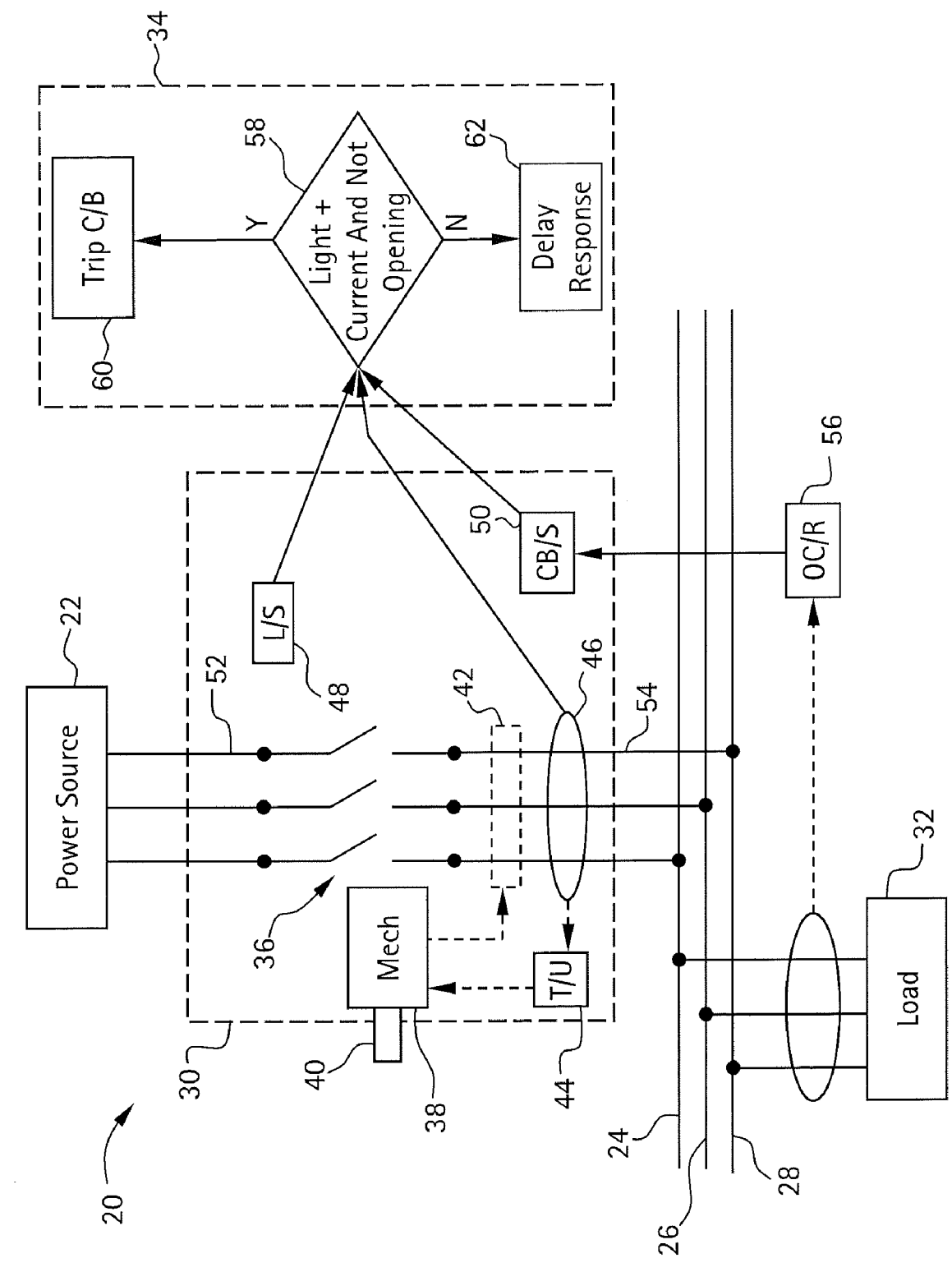
FIG. 1 is schematic view of an electrical circuit with an arc flash detection system in accordance with an exemplary embodiment.

Systems for the detection of arc flash events are integrated with devices such as circuit breakers to allow the interruption of electrical power and minimize damage caused by the arc flash. FIG. 1 shows an electrical circuit 20 with a power source 22, that provides 3-phase electrical power A, B, C to three respective buses 24, 26, 28 protected by a signal controllable circuit breaker 30. Power is provided via the buses to one or more loads 32.

The circuit breaker 30 is generally arranged to open under abnormal operating conditions, such as a short circuit for example. However, typically circuit breakers may not open in case of an arc flash 30 because the current flowing across an arc flash is less than the current levels of a short circuit, which trips the circuit breaker 30. To provide this additional level of functionality, an arc flash detector 34 monitors the operating conditions of the circuit breaker 30 to detect an arc flash event.

The circuit breaker 30 further includes one or more contact arms 36 that are arranged to move between an closed state, where current flows from the power source 22 to the load 32, and an open state where the flow of electrical power is interrupted. The contact arms 36 are electrically coupled to an inlet terminal 52 that electrically connects the circuit breaker 30 to the power source 22. The contact arms 36 are further coupled to a mechanism 38 that includes components such as springs and linkages to move the contact arms 36 from a closed to an open position when activated by an operator through an opening switch or handle 40 for example. The mechanism also uses a trip bar assembly 42 that allows the contact arms 36 to be opened quickly in the event of an abnormal operating condition.

The mechanism 38 is also coupled to a trip unit 44. The trip unit 44 may be electronic, having a controller with a processor that executes computer instructions for controlling the operation of the circuit breaker 30. The trip unit 44 may also be a mechanical assembly incorporating components such as magnets or thermally responsive devices that activate the trip bar assembly 42 in the event of an abnormal operating condition. Where the trip unit 44 is an electronic unit, a set of current transformers 46 provide a signal indicative of the current level flowing through the circuit breaker 30 into the busses 24, 26, 28.

The circuit breaker 30 also includes a first sensor 48 and a second sensor 50 that are electrically coupled to the arc flash detector 34. As will be discussed in more detail below, the arc flash detector 34 uses data received from the first sensor 48 and the second sensor 50 to determine if an arc flash event is occurring, or if event is a normal or expected operating condition. In the exemplary embodiment, the first sensor 48 is a light sensor or photo-detector. The light sensor 48 transmits a signal in response to photons of light striking a detector within the light sensor 48. Since an arc flash generates light, the transmission of a signal from the light sensor is an indicator of an arc flash event. However, within the housing 31 of a circuit breaker 30, there are also other events that may also generate light. For example, when the circuit breaker is operated between a closed position and an open position, a plasma arc is momentarily created between a contact on the contact arm and a stationary contact coupled to the outlet terminal 54 of the circuit breaker. This type of plasma arc is created any time the electrical contacts are separated and current is interrupted. It should be appreciated that the arc flash detector 34 needs to differentiate a signal from the light detector 48 that results from the normal operation of the circuit breaker 30.

To distinguish an arc flash event from normal operation, the arc flash detector 34 utilizes data from the circuit breaker parameter sensor 50. The circuit breaker parameter sensor 50 may be any type of sensor that provides an indication of the operation of the circuit breaker 30, these type of sensors include, but are not limited to a potential transformer, an indicator switch coupled to the contact arms 36, an indicator switch coupled to the mechanism 38, an indicator switch coupled to the tripping bar assembly 42, or a sensor electrically coupled to an external device such as an over-current sensor 56. It should be appreciated that the examples of circuit breaker parameter sensor 50 are exemplary and the scope of the claims should not be so limited.

The arc flash detector 34 includes algorithms embodied in executable computer instructions for comparing the signal from the light sensor 48, the current levels from the current transformers 46 and the parameter sensor 50 as illustrated in block 58. If a signal is received light sensor 48 and the current transformers 46 measure abnormal current levels, the arc flash detector 34 determines the operating state of the circuit breaker 30. If the parameter sensor 50 indicates that the contact arm is in the closed position, this is an indication that an arc flash event is occurring since the light detected by the light sensor 48 is not due to the separation of the circuit breaker contacts. The arc flash detector 34 then proceeds to block 60 where a signal is transmitted to the trip unit 44 whereupon the mechanism 38 is activated causing the circuit breaker contacts to separate and the flow of electrical power is interrupted. If block 58 returns a negative, meaning that light sensor 48 has transmitted a signal, and the parameter sensor 50 this indicates that at least one of the contact arms 36 has moved. For example, if the over-current sensor 56 indicates a high current level, then this would indicate that the circuit breaker is going to is tripping to clear the fault. The arc flash detector proceeds to block 62 where the response of the arc flash detector 34. After a predetermined time period the arc flash detector 34 returns to its normal state.

Figure 2:
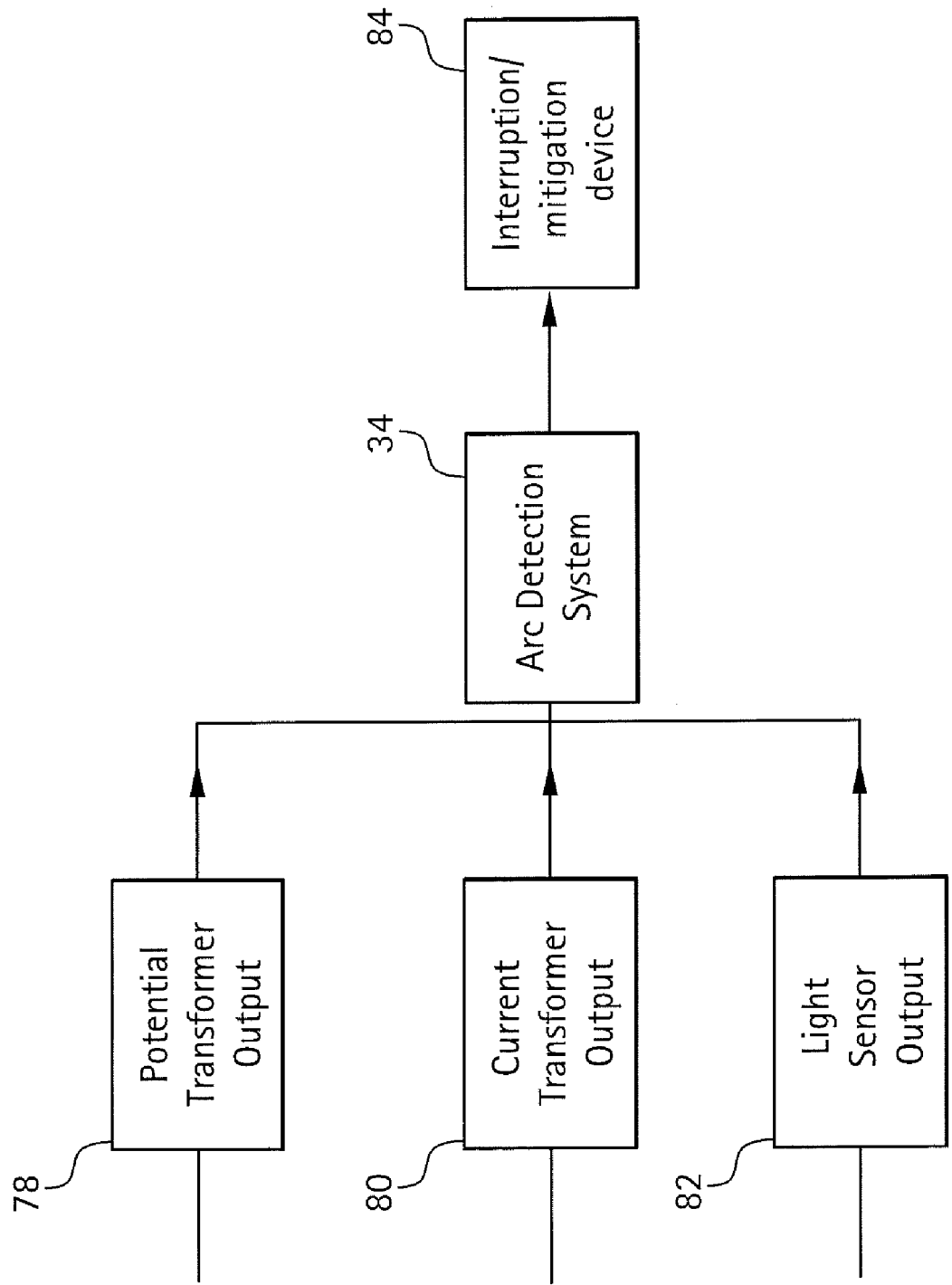
FIG. 2 is a schematic view of an embodiment of the arc flash detection system using a potential transformer.
Figure 3:
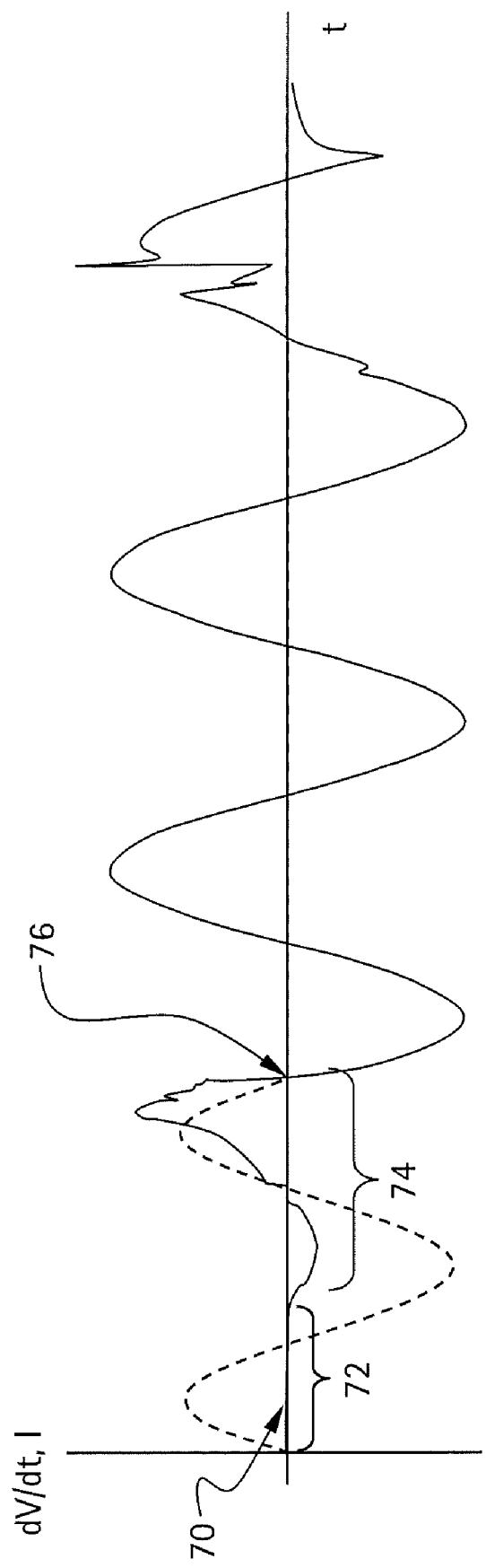
FIG. 3 is a graphical representation of voltage and current curves for a circuit breaker while the contact arms are separating.
Figure 4:
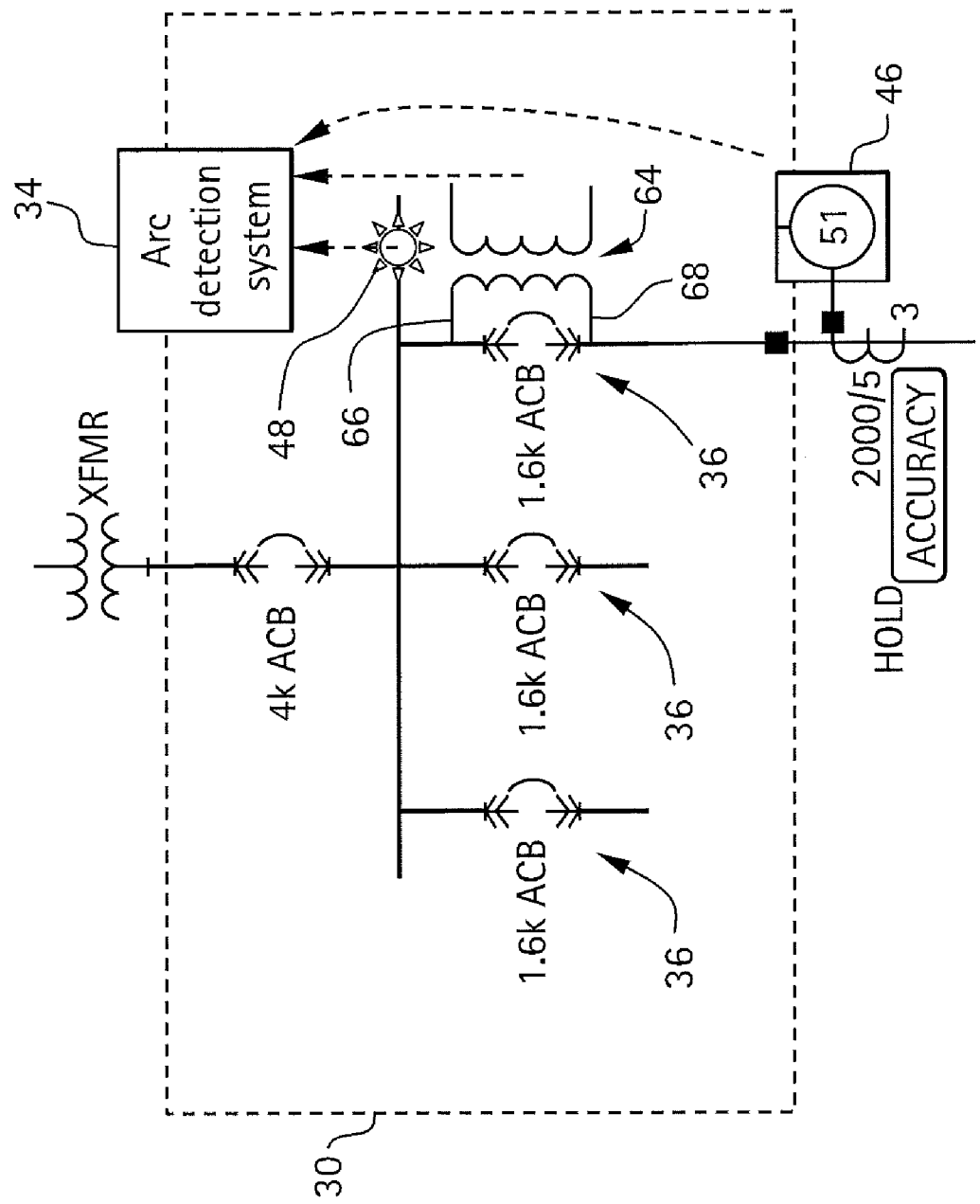
FIG. 4 is a schematic view of an electrical circuit for the embodiment of FIG. 2.

Referring now to FIGS. 2-4, an exemplary embodiment is shown wherein the parameter sensor 50 is a potential transformer 64 coupled to the circuit breaker 30. The potential transformer 64 includes a first connection 66 electrically coupled to the inlet terminal 52 side of the circuit breaker 30. A second connection 68 of potential transformer 64 is electrically coupled to the outlet terminal 54 side of the circuit breaker 30. A potential transformer 64 is a type of transformer allows the measurement of voltages with a high degree of accuracy. The potential transformer steps higher level voltages and currents to lower levels that can be directly measured using normal metering equipment.

During operation, the arc flash detector 34 receives measurements of the current and voltage at the circuit breaker 30. When conditions are normal, the derivative of the voltage measurement dV/dT, as depicted by line 70 in FIG. 3, is zero or nearly zero. Thus, when the dV/dT curve is zero, as in section 72 for example, this is an indication that the contact arm 36 is closed and not moving. As the contact arm 36 moves, the dV/dT curve changes, as illustrated in section 74 for example. This change in the dV/dT curve indicates that the contact arms 36 are opening and the arc flash detector 34 delays in responding to the light sensor 48 signal, such as to the end of section 74. If the light sensor 48 is still transmitting a signal at the end of section 74, at point 76 for example, this would indicate an arc flash event was occurring. In this situation, where the contact arms 36 have already moved and an arc flash is occurring, the arc flash detector may take additional steps, such as signaling an upstream circuit breaker (not shown) to interrupt the flow of electrical power or use other arc flash mitigation techniques as are known in the art.

Thus, in the exemplary embodiment, the arc flash detector 34 takes data from the potential transformer output 78, the current transformer output 80 and the light sensor output 82 as inputs. These inputs are compared against known values for expected operational states and follows a logic decision tree to determine what actions need to be made, such as delay of arc flash response 84 for example. Therefore, the arc flash detection method will reduce nuisance tripping of the circuit breaker 30 when no arc flash events are occurring. The reduction of nuisance tripping reduces the maintenance and operational costs of the electrical circuit 20.

Figure 5:
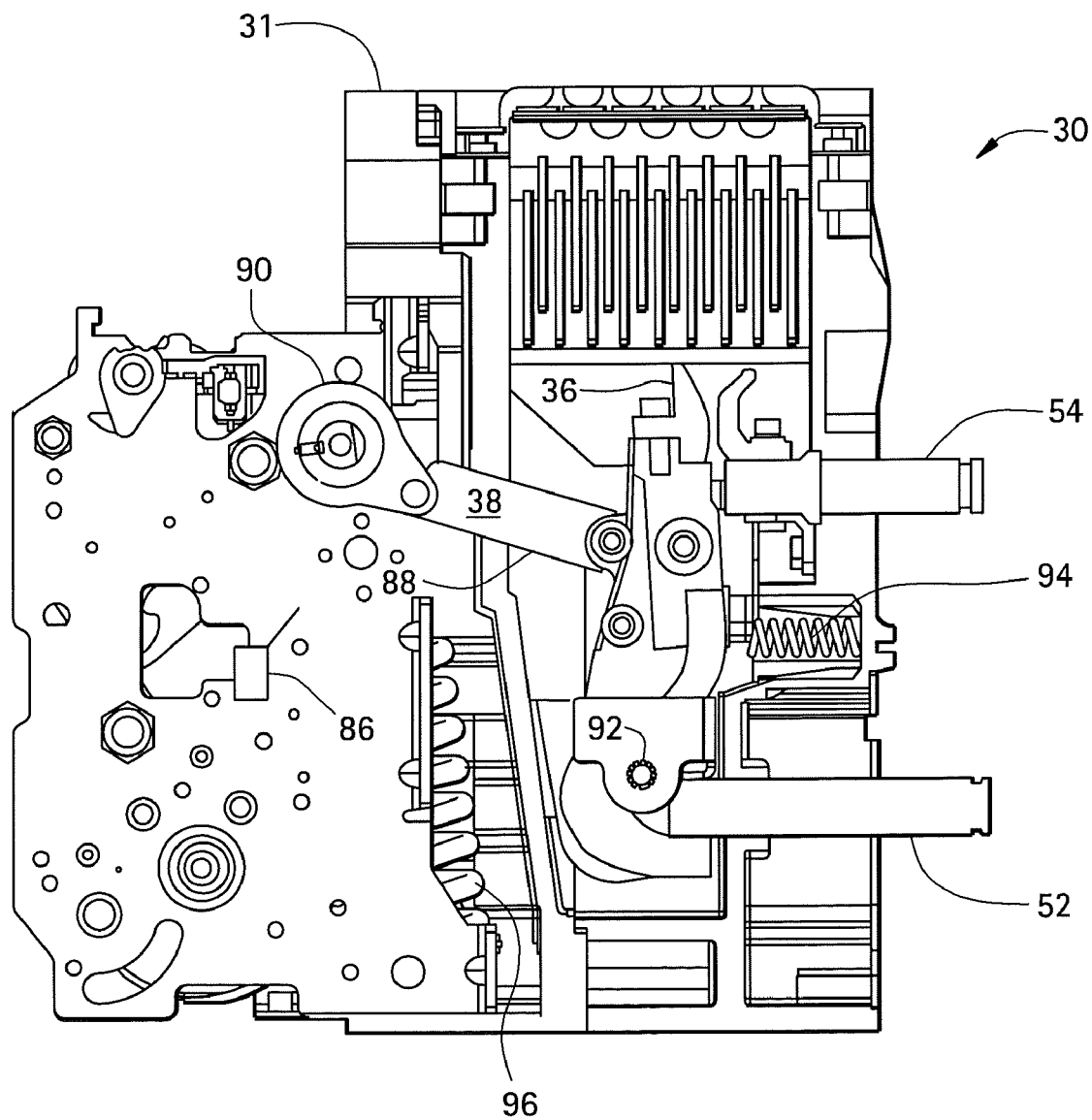
FIG. 5 is a plan view illustration of a circuit breaker having a circuit breaker parameter sensor associated with a circuit breaker mechanism.
Figure 6:
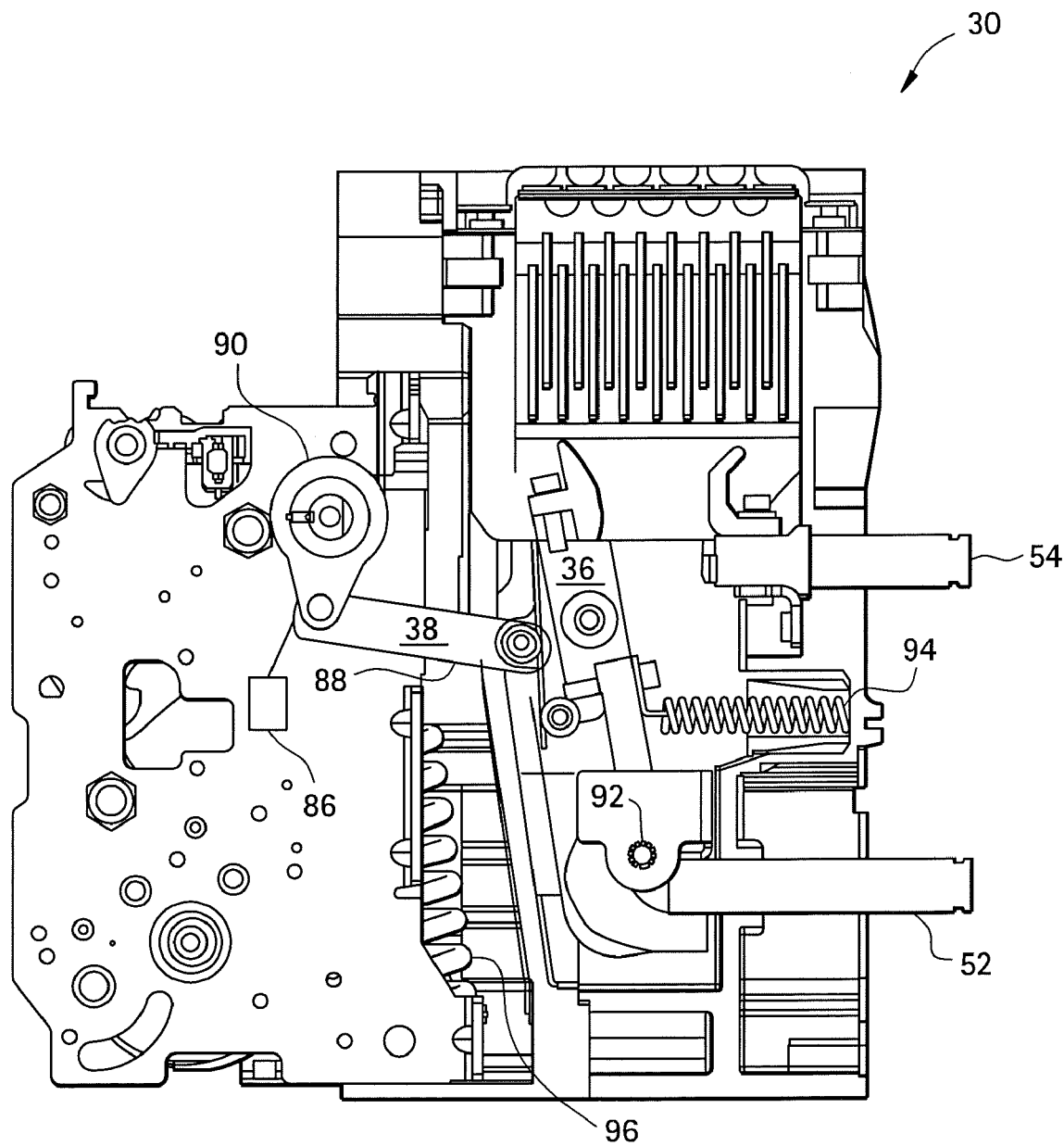
FIG. 6 is a plan view illustration of the circuit breaker of FIG. 5 wherein the circuit breaker is in the open position.

Turning now to FIG. 5 and FIG. 6, another embodiment is illustrated where the circuit breaker parameter sensor 50 is a switch, such as a microswitch 86 for example. As discussed above, the circuit breaker 30 includes a contact arm 36 that is coupled between the inlet terminal 52 and the outlet terminal 54. The circuit breaker mechanism 38 is coupled to the contact arm 36 via linkages 88, 90. The linkages 88, 90 along with the mechanism 38 cause the contact arms 36 to close under the force of closing springs 96. The linkages 88, 90 further hold the contact arms 36 in the closed position against the force of springs 94 until released, such as by the trip bar assembly 42.

During operation, while the contact arms 36 are in the closed position (FIG. 5), the microswitch 86 is in the open position. When the contact arms open (FIG. 6), such as due to a fault detected by trip unit 44 or by the activation of the mechanism 38 for example, the linkages 88, 90 initiate movement causing the contact arm 36 to rotate about a pivot 92. This rotation is due to the force exerted by springs, such as springs 94 for example. The rotation of the contact arms 36 causes the interruption of electrical power and disconnects the electrical circuit from the power source 22.

As the linkages 88, 90 move from the closed position to the open position, a surface on linkage 90 interacts with microswitch 86. This interaction causes the microswitch 86 to move from the open position to the closed position. The closing of the microswitch 86 completes a circuit that results in the transmission of a signal to the arc flash detector 34. As discussed above, the opening of the contact arms 36 causes a momentary plasma arc to be formed that may be detected by the light sensor 48. The transmission of the signal when the microswitch 86 closes indicates to the arc flash detector 34 that the contact arms 36 are opening and that the response of the detector 34 should delayed. Thus, nuisance tripping and false indications of an arc flash event may be avoided. It should be appreciated that while the microswitch 86 is illustrated as interacting with the linkage 90, this illustration is exemplary and the microswitch 86 may be arranged to interact with any linkage within the mechanism 38, such as linkage 88 for example. Further, the microswitch 86 may also be arranged to interact directly with the contact arms 36 to further minimize the amount of time it takes to transmit a signal indicating that the contact arms 36 are opening.

Figure 7:
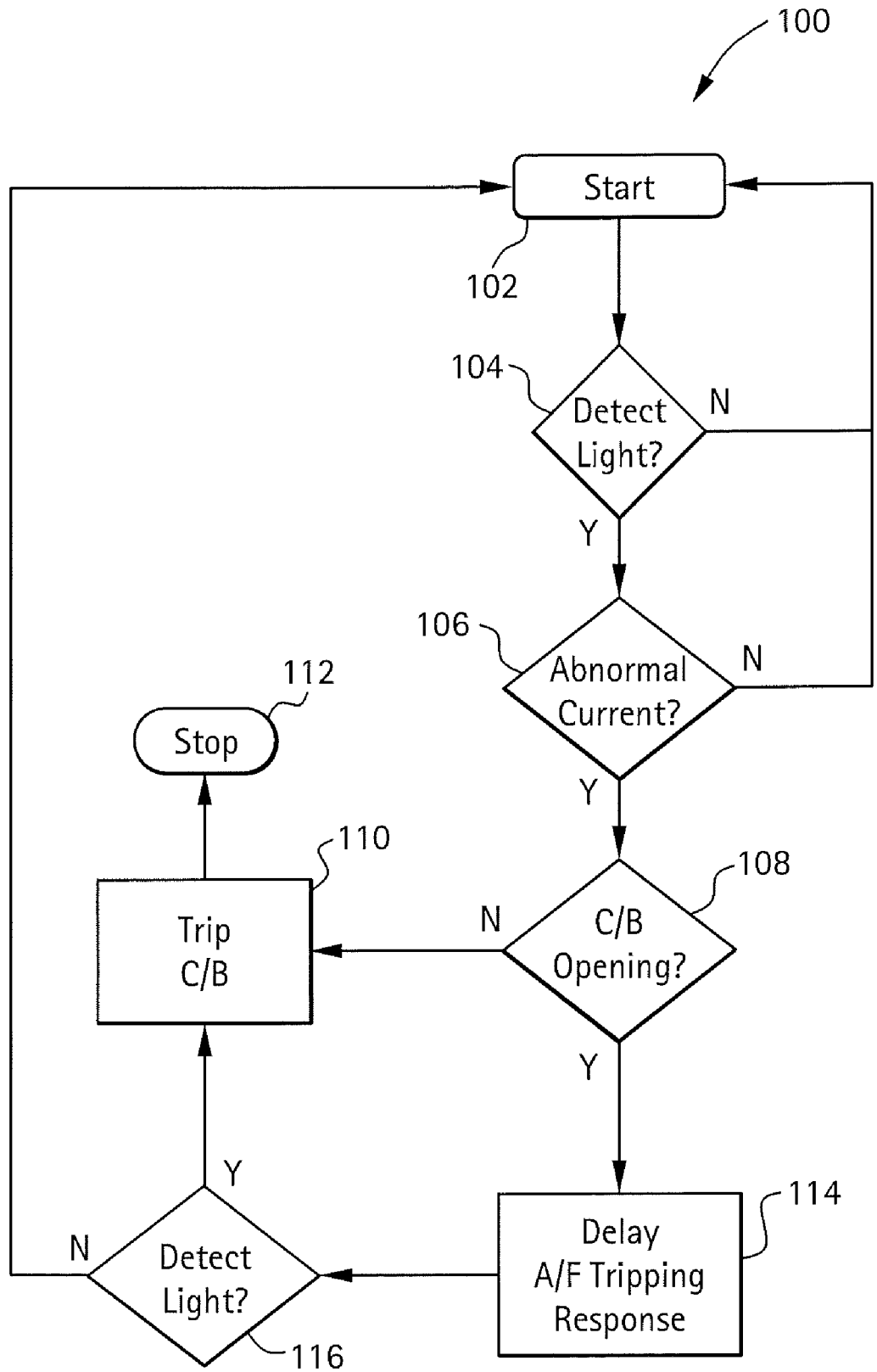
FIG. 7 is a flowchart of an arc flash detection method in accordance with an exemplary embodiment.

The arc flash detector 34 may include one or more processors and associated electronic components (not shown) that are capable of receiving, storing and executing computer instructions that allow the arc flash detector to implement the methods described herein. An exemplary process 100 for minimizing nuisance trips and false indications of arc flash events is illustrated in FIG. 7. Process 100 starts in block 102 and proceeds to decision block 104 where it is determined if light has been detected by light sensor 48. If decision block 104 returns a negative, the process 100 loops back to start block 102 an the process 100 begins again.

If the decision block 104 returns a positive, the process 100 proceeds to decision block 106 to determine if there are any abnormal current levels being measured by the current transformers 46. If there are no abnormal current readings, the process 100 once again loops back to start block 102. If decision block 106 returns a positive, the process 100 proceeds to block 108 to determine if the circuit breaker parameter sensor 50 has provided any signals that the circuit breaker is being opened. Using the example above in reference to FIGS. 5-6, if the microswitch 86 has not been activated, the decision block 108 returns a negative. This may indicate the occurrence of an arc flash event. The process 100 then proceeds to block 110 where the circuit breaker mechanism is tripped allowing the linkages 88, 90 to move under the force of springs 94 and interrupting the flow of current into the electric circuit 20. The process 100 then stops in block 112.

If decision block 108 returns a positive, this indicates that the contact arms 36 are opening and the light detected by light sensor 48 is not due to an arc flash event. The process 100 then proceeds to block 114 where the response of the arc flash detector 34 is delayed for a predetermined amount of time. Once this time period expires, such as at point 76 in FIG. 3 for example, it is determined if light sensor 48 is still detecting light in decision block 116. If decision block 116 returns a positive, meaning that light is still being detected, then process 100 moves to block 110 where the circuit breaker is tripped and the process stops in block 112. If decision block 116 returns a negative, the process 100 loops back to block 102 and starts again.

While an embodiment of the invention has been described and depicted with block diagrams of integrated logic circuit components, it will be appreciated that the scope of the invention is not so limited, and that the invention will also apply to arc flash detectors that may utilize discrete logic circuit components or utilize a mechanical timing delay rather than one incorporated in software.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of detecting an arc flash with a circuit breaker, the method comprising:
   detecting the presence of light in said circuit breaker;
   detecting a circuit breaker parameter indicating the position of a contact arm of said circuit breaker;
   delaying the response of an arc flash detector for a fixed period of time; and
   tripping said circuit breaker after said fixed period of time if said light is still detected.

2. The method of claim 1 wherein said detecting a circuit breaker parameter includes the step of measuring a voltage potential between an input side and an outlet side of said circuit breaker.

3. The method of claim 2 further comprising the step of taking the derivative of the measured voltage.

4. The method of claim 3 wherein said delaying the response of an arc flash detector is performed if the value of said voltage derivative changes in response to said detecting the presence of light.

5. The method of claim 1 further comprising the step of receiving a signal to open said circuit breaker, and performing said delaying the response of an arc flash detector in response to receiving said signal.

6. The method of claim 1 further comprising the step of monitoring the position of electrical contacts in said circuit breaker.

7. The method of claim 6 further comprising the step of transmitting a signal if said electrical contacts start to separate.

8. The method of claim 6 further comprising the step of generating a signal if a trip bar assembly is activated.

9. A circuit breaker comprising:
   a housing;
   an inlet terminal at one end of said housing;
   an outlet terminal at an end of said housing, said outlet terminal being electrically coupled to said inlet terminal;
   a movable contact arm within said housing, said contact arm being electrically coupled between said inlet terminal and said outlet terminal;
   a light sensor positioned to detect the presence of light in said housing;
   a parameter sensor coupled to measure a circuit breaker parameter indicative of a position of said movable contact arm; and, a controller electrically coupled to said light sensor and said parameter sensor, said controller being responsive to delay tripping of said circuit breaker in response to signals from said light sensor and said parameter sensor.

10. The circuit breaker of claim 9 wherein said parameter sensor is a potential transformer operably coupled between said inlet terminal and said outlet terminal.

11. The circuit breaker of claim 9 wherein said parameter sensor is responsive to a signal from a circuit breaker opening device.

12. The circuit breaker of claim 9 wherein said controller further includes a processor responsive to executable computer instructions for performing said delaying the tripping response of said circuit breaker in response to receiving said signal from said light sensor and said parameter sensor.

13. The circuit breaker of claim 11 wherein said circuit breaker opening device is a manual circuit breaker open switch.

14. The circuit breaker of claim 9 wherein said parameter sensor is a switch operably coupled to detect movement of said contact arm.

15. The circuit breaker of claim 9 further comprising a trip bar assembly operably coupled to open said contact arm, and wherein said parameter sensor is a switch operably coupled to detect movement of said trip bar assembly.

16. A circuit breaker comprising:
a housing;
a movable contact arm disposed within the housing;
a light sensor;
a parameter sensor indicative of a position of said movable contact arm; and,
a trip unit electrically coupled to said light sensor and said parameter sensor, said trip unit having a controller responsive to executable computer instructions for delaying the tripping response of said circuit breaker in response to receiving a signal from said light sensor and said parameter sensor.

17. The circuit breaker of claim 16 wherein said parameter sensor is a potential transformer electrically coupled to transmit a signal said trip unit, wherein said controller is further responsive to executable computer instructions for delaying the tripping response of said circuit breaker in response to a signal from said light sensor and if a derivative of a voltage measured by said potential transformer changes.

18. The circuit breaker of claim 16 wherein:
said trip unit is coupled to said housing; and,
said parameter sensor is a switch operably coupled to transmit a signal in response to said contact arm moving.

19. The circuit breaker of claim 16 further comprising a switch coupled to a circuit breaker opening device, said switch being responsive to transmit a signal if said circuit breaker opening device is activated.

20. The circuit breaker of claim 19 wherein said circuit breaker opening device is an overcurrent relay electrically coupled to said trip unit.

* * * * *